March 2, 1971    W. RINDNER ET AL    3,566,459
PRESSURE SENSITIVE TRANSDUCERS
Filed June 19, 1968

WILHELM RINDNER
AMERICO A. IANNINI
ANDRE GARFEIN
INVENTORS.

BY
ATTORNEYS.

United States Patent Office 3,566,459
Patented Mar. 2, 1971

3,566,459
PRESSURE SENSITIVE TRANSDUCERS
Wilhelm Rindner, Lexington, Americo A. Iannini, Marlboro, and Andre Garfein, Brighton, Mass., assignors to the United States of America as represented by the Administrator of the National Aeronautics and Space Administration
Filed June 19, 1968, Ser. No. 738,315
Int. Cl. B01j 17/00; H011 1/10
U.S. Cl. 29—588                                     3 Claims

ABSTRACT OF THE DISCLOSURE

According to the disclosure, there is disclosed a miniature electromechanical junction transducer, the operation of which is based on piezojunction effect. The mechanical input coupling member, in the subject invention, as distinquished from the prior art, is formed in situ and spread over the top of the mesa structure to form an exact duplicate of the mesa surface at the area of contact.

---

The invention described herein was made by employees of the United States Government and may be manufactured and used by or for the Government for governmental purposes without the payment of any royalties thereon or therefor.

BACKGROUND OF THE INVENTION

This invention relates to electromechanical transducers and more particularly to the technique for mounting a stress coupling or stress transmitting member on a stress sensitive semiconductor device and the resultant device.

Much of the difficulty experienced by the prior art in developing and producing a piezojunction stress transducer, resides in the fact that the mechanical input is concentrated and applied to a relatively small area of the semiconductor device surface. For the most part, the desired stress concentration was accomplished by the use of a fine, hard stylus resting on the device surface or, as in one situation, by a needle-shaped semiconductor diode in contact with a hard flat surface.

In any of the approaches considered so far by the prior art, the operation of the device was based on the principle of providing contact between a semiconductor surface, be it flat or rounded, and a hard pre-shaped solid. Extensive experience has shown that this type of mechanical contact produces instabilities that may be traced to the fact that the stylus and the mesa surface, however well shaped, are bound to have minute irregularities, which may be micron or sub-micron size, produce corresponding uncontrollable and damaging stresses and deformations to the semiconductor and, therefore, device degradation. Also, it is extremely difficult, with such mechanical coupling, to avoid lateral displacement of the stylus, at the contact area, both during the operation of the device and more particularly, during the manufacture or the assembly of the device. Any such movement produces a "noisy" or even a defective device. In any event, in the approach used by the prior art, it is extremely difficult to have the two hard surfaces in uniform contact with each other.

To obviate the difficulties encountered by the prior art it is hereby proposed that a mesa structure be provided and that the stress coupling member be formed in situ in intimate contact with the top of the mesa surface. It is preferable that the stress coupling member be moldable during the manufacturing process yet be extremely hard in the completed device.

By utilizing epoxy, or other materials that are readily moldable during processing but are hard when used as the stress coupling member, and by molding the member in situ, we have found that the pressure across the surface of the mesa is uniform and that the device fabrication has been markedly simplified.

Another benefit derived from this procedure resides in the fact that the completed device is now virtually free of the damaging structural and alignment problems usually encountered in the prior art.

Further, since in our structure the pressure sensitive area of the transducer may be recessed, handling of the delicate structure is no longer a problem.

While the following recitation of the operation of our invention will be described in terms of a diode type device, it should be obvious to those skilled in the art that any semiconductor device having one or more P–N junctions, and one or more of which are pressure or stress sensitive mesa structures, may be appropriately utilized in our device by applying the stress coupling member to the mesa structure.

Further, since the stress transmitting or coupling member is firmly bonded to the top of the mesa surface, we are also able to detect negative pressures as well as positive pressures that may be applied to the stress coupling member without having to pre-stress the stress transmitting or coupling member.

It is, therefore, one object of the present invention to provide a miniature piezojunction, electromechanical transducer wherein the stress transmitting or coupling member is molded in situ.

Another object of the present invention is to provide a miniature piezojunction, electromechanical transducer wherein the pressure across the top of the mesa is essentially uniform.

Still another object of the present invention is to provide a miniature piezojunction, electromechanical transducer that is virtually free of the damage and alignment problems encountered in the prior art.

A further object of the present invention is to provide a miniature piezojunction, electromechanical transducer wherein the pressure sensitive area of the transducer is recessed, to facilitate the handling of the device.

A still further object of the present invention is to provide a miniature piezojunction, electromechanical transducer that is noted by its ease of manufacture and by its reliability of performance.

Yet a further object of the present invention is to provide a miniature piezojunction, electromechanical transducer capable of measuring negative pressures without having to be pre-stressed.

The features of our invention which we believe to be novel are set forth with particularity in the appended claims. Our invention itself, however, both as to its organization and method of operation, together with further objects and advantages, may be best understood by reference to the following accompanying drawings.

DESCRIPTION OF THE PREFERRED EMBODIMENTS

Figure 2:
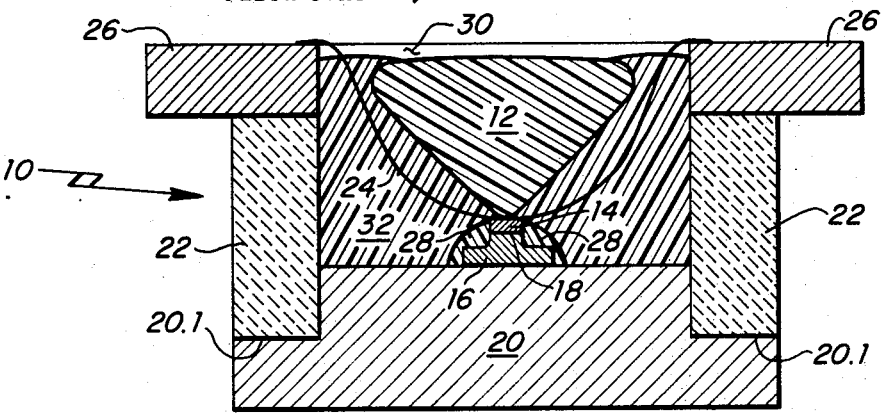
FIG. 2 is a sectional view of our transducer taken along lines 2—2 of FIG. 1.
Figure 1:
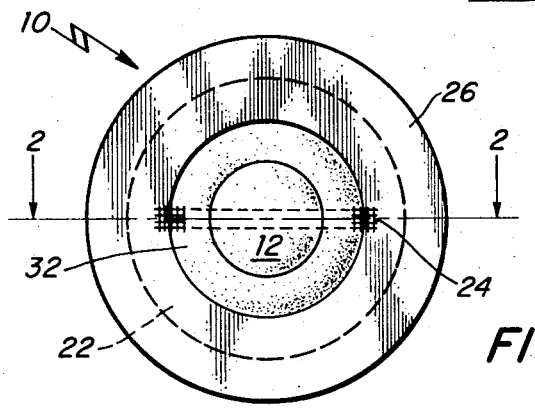
FIG. 1 is a plan view of our novel transducer.

Referring now to FIGS. 1 and 2, there is shown our novel transducer device 10 wherein stress coupling member 12 is in a recessed position and in contact with a semiconductor, stress sensitive device. A first region 14 which may be an N-type semiconductor material is mounted on a second region 16 of semiconductor material, which latter region would be doped with a P-type impurity, with the resulting interface 18 forming the required diode junction. We have found that either Germanium (Ge), Gallium Arsenide (GaAs) and Gallium Antimonide (GaSb) semiconductor junctions may be conveniently produced and utilized in our device, with good results. While we have shown regions 14 and 16 as being N- and P-type materials respectively, it should be obvious to those skilled in the art that our device might work equally well should region 14 be formed of P-type material and chip 16 formed of N-type material.

Chip 16, with its provided tunnel diode mesa portion is affixed to bottom diode contact 20 which provides one of the electrical connections to the device, so that our device may be utilized in a circuit. Bottom contact 20 is further provided with a shoulder portion 20.1 on which a circular ceramic support member 22 may be affixed. The combination of ceramic member 22 and bottom diode contact 20 forms a cavity 30 within which both the tunnel diode (14, 16 and 18), as well as the stress coupling element (12) is recessed. Contact strip 24 is provided to furnish a means of electrical connection between the top of mesa 14 and diode contact 26.

In the manufacture of our device, junction 18 is formed by appropriately combining P and N type materials, utilizing any of the well known methods. Ceramic ring 22 is bonded onto shoulder 20.1 of bottom diode contact 20, and top diode contact 26 is affixed to the uppermost portion of ring 22 to form cavity 30. The diode assembly (14, 16 and 18) is then cemented or soldered to or otherwise fixed, in good electrical contact, to bottom diode contact 20. Metallic contact strip 24 is then set into the device so as to extend between top diode contact 26 and the upper surface of mesa 14. Mesa 14 is then provided with an insulating plastic supporting structure 28 which may be an epoxy, to firmly embed and fix its position on and with respect to chip 16. Thereafter cavity 30 is filled with an epoxy material 32.

Epoxy 32 is first placed into cavity 30 on bottom diode contact 20 in such a manner as to surround the outer perimeter of chip 16 and is built up along the sides of ceramic ring 22 until the desired form for stress coupling member 12 has been produced. It should be noted at this point that, in order to prevent loss of mechanical input signal at the junction, epoxy 32 should have, when fully set and cured, a modulus of elasticity longer than that of the diode and that of the stress coupling member. As shown in FIG. 2, the epoxy material 32 and the plastic structure 28 form a mold that isolates the mesa surface 14 from the remainder of the semiconductor 16.

Once epoxy 32 has set and formed into the desired shape, additional epoxy is placed into the mold to form stress coupling member 12. The epoxy used to form stress coupling member 12 must, when set, be much harder than epoxy 32. When so formed, stress coupling member 12 is in contact, at its apex end with the top surface of mesa portion 14. After an appropriate curing period for filler epoxy 32 and stress coupling member 12, the device is completed and ready for use.

Alternatively, member 12 may be formed so that the upper surface is extended to be in contact with diode contact 26, thereby sealing cavity 30. Under these circumstances, the device is capable of responding to the mechanical signals of frequencies ranging down to D.C.

Figure 3:
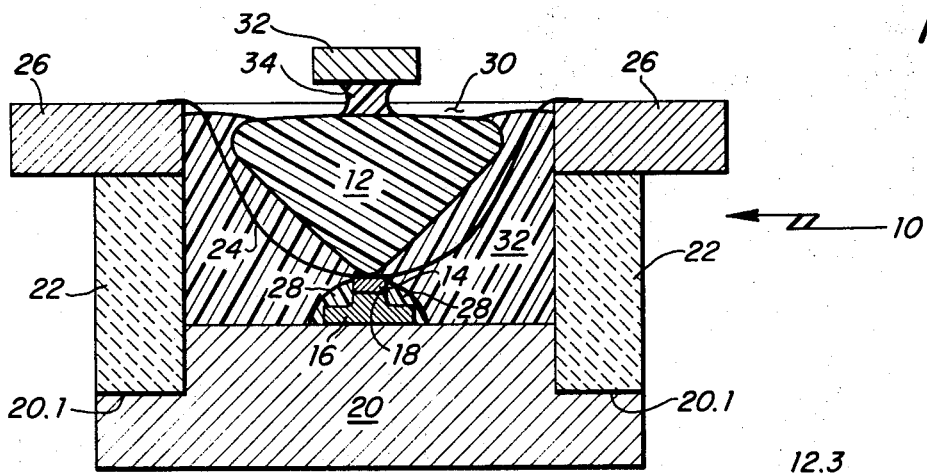
FIG. 3 is a sectional view of another embodiment of our invention.

Referring now to FIG. 3, wherein elements similar to those shown in FIGS. 1 and 2 are similarly numbered, it will be seen that we are able to utilize the basic structure of our novel device as a small, sensitive accelerometer. This is realized by attaching a seismic mass, such as member 32, to the exposed portion of member 12 by means of coupler 34. This coupler 34 may take the form of an epoxy cement or any other suitable means for rigidly fixing seismic mass 32 to member 12. Member 32 acts as the seismic mass, which, upon acceleration, produces a force on the transducer.

Figure 4:
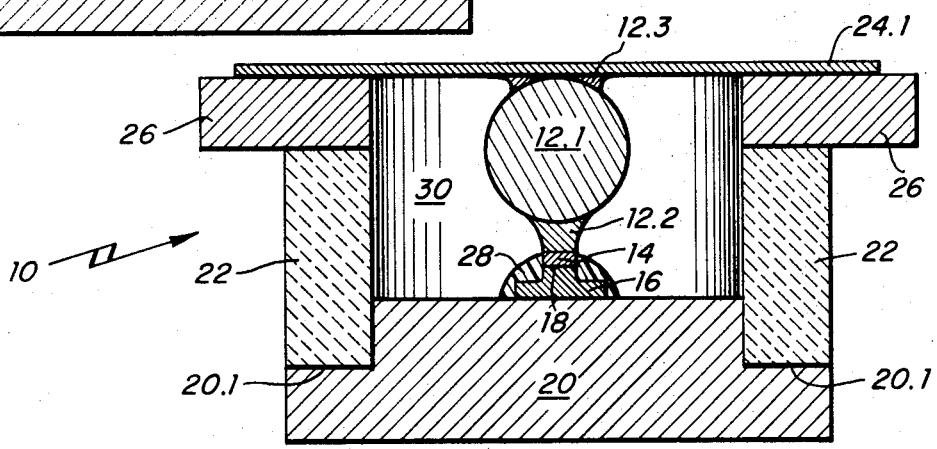
FIG. 4 is a sectional view of still another embodiment of our novel transducer.

Referring now to FIG. 4, there is shown still another embodiment of our invention wherein elements similar to those shown in FIGS. 1–3 are similarly numbered. In this embodiment, a premolded stress coupling member 12.1 is firmly affixed, by means of a cement or an epoxy, moldable interface 12.2 to the surface of the mesa structure. It should be here noted that in this embodiment, the epoxy filling (32, FIGS. 1, 2 and 3) is absent. Interface member 12.2 is formed after cavity 30 is provided with a removable, moldable material such as wax. In this situation, after the wax has been formed in the cavity, with a suitable configuration to form the interface member 12.2, the epoxy for the interface member 12.2 is introduced into the form and the wax removed. In this latter embodiment, if it is so desired, members 12.1, 12.2 and 12.3 may be formed of an electrically conductive material, obviating the need for contact strip 24 of FIGS. 2 and 3. A conductive membrane 24.1 is stretched across cavity 30 and attached to diode contact 26. The center thereof in contact with or attached to the top or exposed surface of the premolded stress coupling member 12.1 by means of material 12.3.

While we have described what is presently considered the preferred embodiments of our invention, it will be obvious to those skilled in the art, that various other changes and modifications may be made therein without departing from the inventive concept and, it is therefore, aimed in the appended claims to cover all such changes and modifications as fall within the true spirit and scope of our invention.

What is claimed is:
1. The method of producing a strain sensitive semiconductor device which comprises:
   providing a semiconductor having at least a mesa structure;
   preparing a mold that isolates said mesa structure from the remainder of said semiconductor; and
   molding a stress coupling member in said mold, the molded member connected to and in intimate contact with a substantial portion of the mesa structure.

2. The method of claim 1 wherein said mold preparation step comprises:
   providing first and second electrically conductive contact members;
   affixing the first and second contact members to opposite ends of a spacer member to form a cavity portion;
   affixing the semiconductor to the second contact member; and
   including the further step of connecting an electrically conductive contact member between the mesa structure and the first contact member.

3. The method of claim 2, wherein said mold preparation step comprises:
   partially filling the cavity portion with a first inert material to cover the sides of the cavity and to surround the mesa structure; and
   said molding step comprises filling the remainder of the cavity with a second inert material; the second inert material connected to and in intimate contact with the mesa structure.

References Cited
UNITED STATES PATENTS

| | | | |
|---|---|---|---|
| 2,530,745 | 11/1950 | Wallace | 317—235UX |
| 3,030,557 | 4/1962 | Dermit | 29—589UX |
| 3,223,903 | 12/1965 | Solomon | 29—578UX |
| 3,374,533 | 3/1968 | Burks et al. | 29—589X |
| 3,424,956 | 1/1969 | Sato et al. | 29—589X |

JOHN F. CAMPBELL, Primary Examiner

W. TUPMAN, Assistant Examiner

U. S. Cl. X.R.

29—591, 25.35, 595; 264—255, 272; 317—235